(12) United States Patent
Mitsunobu et al.

(10) Patent No.: US 12,516,405 B2
(45) Date of Patent: Jan. 6, 2026

(54) PLATED STEEL SHEET

(71) Applicant: NIPPON STEEL CORPORATION, Tokyo (JP)

(72) Inventors: Takuya Mitsunobu, Tokyo (JP); Keitaro Matsuda, Tokyo (JP); Hiroshi Takebayashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 74 days.

(21) Appl. No.: 18/579,732

(22) PCT Filed: Sep. 30, 2022

(86) PCT No.: PCT/JP2022/036832
§ 371 (c)(1),
(2) Date: Jan. 16, 2024

(87) PCT Pub. No.: WO2023/054705
PCT Pub. Date: Apr. 6, 2023

(65) Prior Publication Data
US 2024/0318288 A1  Sep. 26, 2024

(30) Foreign Application Priority Data

Oct. 1, 2021 (JP) ................ 2021-162623

(51) Int. Cl.
*C22C 38/38* (2006.01)
*B32B 15/01* (2006.01)
(Continued)

(52) U.S. Cl.
CPC ............ *C22C 38/38* (2013.01); *B32B 15/013* (2013.01); *C22C 38/001* (2013.01);
(Continued)

(58) Field of Classification Search
CPC ... B32B 15/013; C22C 38/001; C22C 38/002; C22C 38/005; C22C 38/02; C22C 38/04;
(Continued)

(56) References Cited

U.S. PATENT DOCUMENTS

2015/0329946 A1  11/2015  Yasui et al.
2016/0160335 A1  6/2016  Ikeda
(Continued)

FOREIGN PATENT DOCUMENTS

JP  2016-130357 A  7/2016
JP  2018-193614 A  12/2018
(Continued)

*Primary Examiner* — Katherine A Christy
(74) *Attorney, Agent, or Firm* — Birch, Stewart, Kolasch & Birch, LLP (57) ABSTRACT

High strength plated steel sheet excellent in LME resistance, that is, plated steel sheet comprising steel sheet and a plating layer containing Zn on the same, in which the steel sheet has a tensile strength of 780 MPa or more, the steel sheet has a chemical composition containing, by mass %,
C: 0.05 to 0.40%,
Si: 0.2 to 3.0%,
Mn: 0.1 to 5.0%,
sol. Al: 0.4 to 1.50%, etc. and having a balance of Fe and impurities, and,
in any vertical cross section of the steel sheet, ferrite phases with a circle equivalent diameter of 1 μm or less are contained in a region from a surface layer down to a depth of 2 μm in a number density of 2 to 30/μm² and the ferrite phases include internal oxides with a circle equivalent diameter of 2 to 100 nm in a number density of 3/μm² or more.

12 Claims, 1 Drawing Sheet

(51) Int. Cl.
*C22C 38/00* (2006.01)
*C22C 38/02* (2006.01)
*C22C 38/04* (2006.01)
*C22C 38/06* (2006.01)
*C22C 38/08* (2006.01)
*C22C 38/12* (2006.01)
*C22C 38/14* (2006.01)
*C22C 38/16* (2006.01)
*C22C 38/32* (2006.01)
*C22C 38/34* (2006.01)

(52) U.S. Cl.
CPC .......... *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/32* (2013.01); *C22C 38/34* (2013.01)

(58) Field of Classification Search
CPC ......... C22C 38/06; C22C 38/08; C22C 38/12; C22C 38/14; C22C 38/16; C22C 38/32; C22C 38/34; C22C 38/38
USPC ........................................................ 428/659
See application file for complete search history.

(56) References Cited

U.S. PATENT DOCUMENTS

2018/0002799 A1    1/2018  Futamura et al.
2020/0232083 A1*   7/2020  Morishita ................ C23C 2/06
2023/0349022 A1    11/2023 Suzuki et al.

FOREIGN PATENT DOCUMENTS

KR    10-2015-0088310 A     7/2015
WO    WO 2022/071305 A1     4/2022
WO    WO 2022/149511 A1     7/2022

* cited by examiner

PLATED STEEL SHEET

FIELD

The present invention relates to plated steel sheet. More specifically, the present invention relates to high strength plated steel sheet excellent in LME resistance.

BACKGROUND

In recent years, the steel sheet used in automobiles, household electrical appliances, building materials, and various other fields has been made increasingly higher in strength. For example, in the automotive field, high strength steel sheet is being increasingly used for the purpose of lightening the weight of car bodies so as to improve fuel economy. Such high strength steel sheet typically contains C, Si, Mn, Al, and other elements for raising the strength of the steel.

In the production of high strength steel sheet, in general, heat treatment such as annealing is performed after rolling. Further, among the elements typically contained in high strength steel sheet, the easily oxidizable elements Si, Mn, and Al sometimes bond with the oxygen in the atmosphere at the time of the above heat treatment to form a layer containing oxides near the surface of the steel sheet. As the form of such a layer, a form where oxides containing Si, Mn, or Al are formed as a film at the outside part (surface) of the steel sheet (external oxidation layer) and a form where oxides are formed at the inside (surface layer) of the steel sheet (internal oxidation layer) may be mentioned.

If forming a plating layer (for example, Zn-based plating layer) on the surface of steel sheet at which an external oxidation layer is formed, oxides are present on the surface of the steel sheet as a film, mutual diffusion of the steel constituents (for example, Fe) and the plating constituents (for example, Zn) is obstructed, the adhesion between the steel and plating is affected, and sometimes the plateability becomes insufficient (for example, nonplated parts increase). Accordingly, from the viewpoint of improving the plateability, rather than steel sheet at which an external oxidation layer is formed, steel sheet at which an internal oxidation layer is formed is preferable.

In relation to the internal oxidation layer, PTLs 1 and 2 describe high strength plated steel sheet of a tensile strength of 980 MPa or more comprised of a base steel sheet containing C, Si, Mn, Al, etc. and a Zn-based plating layer on the same, in which plated steel sheet, the surface layer of the base steel sheet has an internal oxidation layer containing Si and/or Mn.

CITATIONS LIST

Patent Literature

[PTL 1] Japanese Unexamined Patent Publication No. 2016-130357
[PTL 2] Japanese Unexamined Patent Publication No. 2018-193614

SUMMARY

Technical Problem

High strength plated steel sheet is used in automobile members, home electrical appliances, building materials, and various other fields. If hot stamping or welding plated steel sheet comprised of high strength steel sheet and a Zn-based plating layer etc. on the same, the plated steel sheet is worked at a high temperature (for example, 900° C. or so), therefore it can be worked in a state with the Zn contained in the plating layer melted. In this case, the melted Zn sometimes penetrates the steel resulting in fracture inside the steel sheet. Such a phenomenon is called "liquid metal embrittlement (LME)". It is known that due to that LME, the fatigue characteristics of the steel sheet fall. Therefore, to prevent LME fracture, it is effective to keep Zn, etc. contained in the plating layer from penetrating the steel sheet.

PTLs 1 and 2 teach that by controlling the average depth of the internal oxidation layer to a thick 4 μm or more and making the internal oxidation layer function as trap sites for hydrogen, it is possible to prevent penetration of hydrogen and suppress hydrogen embrittlement. However, improvement of the LME resistance has not been studied.

The present invention, in view of such an actual situation, has as its technical problem to provide high strength plated steel sheet excellent in LME resistance.

Solution to Problem

The inventors discovered that to solve the above technical problem, it is important to form oxides at the surface layer of the steel sheet, that is, at the inside of the steel sheet, and further to control the form of the oxides present at the surface layer of the steel sheet. In more detail, the inventors discovered that by including fine (circle equivalent diameter 1 μm or less) ferrite phases near the steel sheet surface (range from surface to depth of 2 μm) in a predetermined number density ($2/\mu m^2$ or more) and including internal oxides (circle equivalent diameter 2 to 100 nm) inside the ferrite phases in a predetermined number density ($3/\mu m^2$ or more), it is possible to make the internal oxides function as trap sites of Zn potentially penetrating the steel at the time of hot stamping or welding and thereby obtain a high LME resistance.

The present invention is based on the above discovery and has as its gist the following:

(1) Plated steel sheet comprising steel sheet and a plating layer containing Zn on the same, in which plated steel sheet, the steel sheet has a tensile strength of 780 MPa or more, the steel sheet has a chemical composition containing, by mass %,
C: 0.05 to 0.40%,
Si: 0.2 to 3.0%,
Mn: 0.1 to 5.0%,
sol. Al: 0.4 to 1.50%,
P: 0.0300% or less,
S: 0.0300% or less,
N: 0.0100% or less,
B: 0 to 0.010%,
Ti: 0 to 0.150%,
Nb: 0 to 0.150%,
V: 0 to 0.150%,
Cr: 0 to 2.00%,
Ni: 0 to 2.00%,
Cu: 0 to 2.00%,
Mo: 0 to 1.00%,
W: 0 to 1.00%,
Ca: 0 to 0.100%,
Mg: 0 to 0.100%,
Zr: 0 to 0.100%,
Hf: 0 to 0.100%, and
REM: 0 to 0.100% and having a balance of Fe and impurities, and in any vertical cross section of the steel sheet, ferrite phases with a circle equivalent diameter of 1 μm or less are contained in a region from a surface layer down to a depth of 2 μm in a number density of 2 to 30/μm² and the ferrite phases include internal oxides with a circle equivalent diameter of 2 to 100 nm in a number density of 3/μm² or more.

(2) The plated steel sheet according to (1), wherein the internal oxides are shaped with an aspect ratio of 1.5 to 20, have short axes of 1 to 20 nm, and are present in a number density of 3 to 30/μm².

(3) The plated steel sheet according to (1) or (2), wherein the internal oxides comprise one or more of any of Al and O; Al, Si, and O; Al, Mn, and O; and Al, Si, Mn, and O and the content of Al in the internal oxides is 20 to 53 mass %.

(4) The plated steel sheet according to any one of (1) to (3), wherein the plating layer has a chemical composition containing, by mass %, Al: 0.3 to 1.5% and having a balance of Zn and impurities.

(5) The plated steel sheet according to any one of (1) to (3), wherein the plating layer has a chemical composition containing, by mass %, less than Al: 0 to 0.1% and having a balance of Zn and impurities.

Advantageous Effects of Invention

According to the present invention, it is possible to make the internal oxides of the fine ferrite phases present at the surface layer of steel sheet function as trap sites of Zn penetrating the steel at the time of hot stamping or welding, greatly suppress the penetrating amount of Zn, and greatly improve the LME resistance. Accordingly, due to the present invention, it becomes possible to obtain excellent LME resistance in high strength steel sheet.

DESCRIPTION OF EMBODIMENTS

<Plated Steel Sheet>

The plated steel sheet according to the present invention is plated steel sheet comprising steel sheet and a plating layer containing Zn on the same, wherein
the steel sheet has a tensile strength of 780 MPa or more and
the steel sheet has a chemical composition containing, by mass %,
C: 0.05 to 0.40%,
Si: 0.2 to 3.0%,
Mn: 0.1 to 5.0%,
sol. Al: 0.4 to 1.50%,
P: 0.0300% or less,
S: 0.0300% or less,
N: 0.0100% or less,
B: 0 to 0.010%,
Ti: 0 to 0.150%,
Nb: 0 to 0.150%,
V: 0 to 0.150%,
Cr: 0 to 2.00%,
Ni: 0 to 2.00%,
Cu: 0 to 2.00%,
Mo: 0 to 1.00%,
W: 0 to 1.00%,
Ca: 0 to 0.100%,
Mg: 0 to 0.100%,
Zr: 0 to 0.100%,
Hf: 0 to 0.100%, and
REM: 0 to 0.100% and having a balance of Fe and impurities, and,
in any vertical cross section of the steel sheet, ferrite phases with a circle equivalent diameter of 1 μm or less are contained in a region from a surface layer down to a depth of 2 μm in a number density of 2 to 30/μm² and the ferrite phases include internal oxides with a circle equivalent diameter of 2 to 100 nm in a number density of 3/μm² or more.

In the production of high strength steel sheet, a steel slab adjusted to a predetermined chemical composition is rolled (typically, hot rolled and cold rolled), then in general is annealed for the purpose of obtaining the desired microstructure. In this annealing, constituents which relatively easily oxidize in steel sheet (for example, Si, Mn, and Al) bond with the oxygen in the annealing atmosphere whereby a layer including oxides is formed near the surface of the steel sheet.

Figure 1:
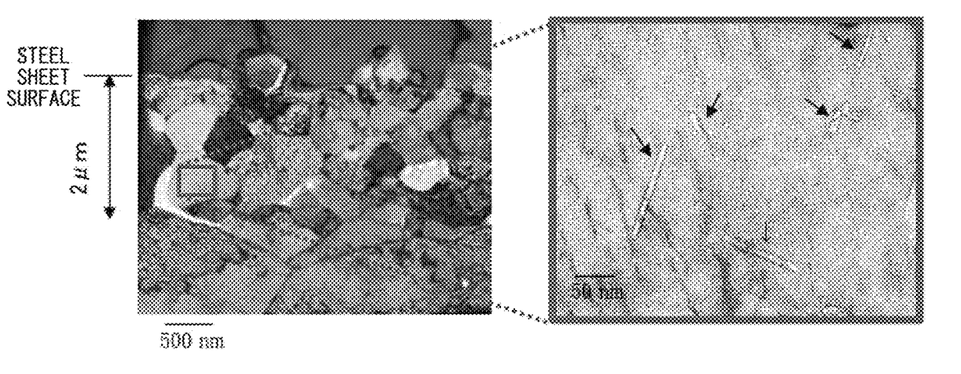
The FIGURE shows photos of cross sections of an example of steel sheet according to the present invention.

In relation to this, the photos of the FIGURE show examples of cross sections of plated steel sheet according to the present embodiment. The left photo of the FIGURE shows the steel cross-sectional microstructure in a range of a depth of 2 μm from the steel sheet surface of the plated steel sheet (interface of plating layer/steel sheet) to the steel sheet side. Ferrite phases forming the microstructure and having circle equivalent diameters of 1 μm or less can also be confirmed. The right photo of the FIGURE shows part of the left photo enlarged. Inside the ferrite phase, rod-shaped internal oxides (shown by arrows) having circle equivalent diameters of 100 nm or less can also be confirmed.

If hot stamping or welding plated steel sheet provided with a plating layer containing Zn on the steel sheet surface, since the temperature becomes high at the time of working it, the Zn contained in the plating layer sometimes melts. If the Zn melts, sometimes the melted Zn penetrates the steel. If worked in that state, inside of the steel sheet, liquid metal embrittlement (LME) fracture occurs. Due to that LME, the fatigue characteristics of the steel sheet sometimes fall. The inventors discovered, as explained above, that if the fine ferrite phases and their internal oxides have the desired number densities near the surface layer of the steel sheet, this contributes to improvement of the LME resistance. In more detail, they discovered that the internal oxides of the fine ferrite phases function as trap sites for the Zn trying to penetrate the steel during working at a high temperature. Due to this, the Zn trying to penetrate the steel at the time of for example hot stamping is captured by the internal oxides of the fine ferrite phases at the surface layer of the steel sheet and penetration of Zn to the inside of the steel sheet is suppressed well. Therefore, the inventors discovered that to improve the LME resistance, it is important to establish the presence of internal oxides of the fine ferrite phases in a predetermined number density.

In more detail, if the Zn contained in the plating layer melts due to hot stamping or welding, the melted Zn diffuses from the interface of the steel sheet where the plating layer is provided (interface of plating layer and steel sheet) toward the depth direction of the steel sheet. At this time, the melted Zn diffuses along the grain boundaries of the crystal grains forming the steel sheet microstructure and diffuses from the grain boundaries to the insides of the crystal grains as well. If internal oxides are present inside the crystal grains, the Zn is trapped by the internal oxides and the Zn is kept from further diffusing to the inside of the steel sheet. In the present embodiment, the ferrite phases near the steel sheet surface are fine in size (compared with cases where the ferrite phases are coarse), so there are many routes of the grain boundaries (or phase interfaces) and the distances from the grain boundaries to the internal oxides inside the grains (or inside the phases) are short, so the melted Zn quickly proceeds to be trapped by the internal oxides of the ferrite phases. That is, the melted Zn is quickly trapped near the surface of the steel sheet and is remarkably kept from diffusing to the inside of the steel sheet, in particular a location deeper than the steel sheet surface layer. As a result, liquid metal embrittlement (LME) fracture at the inside of the steel sheet is suppressed and the fatigue characteristics of the steel sheet are kept from falling due to the LME. Note that, the metal microstructure of the surface layer of the steel sheet is typically comprised of metal structures softer than the inside of the steel sheet (for example, ⅛ position or ¼ position of sheet thickness), so even if Zn is present at the surface layer of the steel sheet, liquid metal embrittlement (LME) fracture will not pose a particular problem.

Below, the steel sheet according to the present invention will be explained in detail. Note that, the sheet thickness of the steel sheet according to the present invention is not particularly limited, but for example may be 0.1 to 3.2 mm.

[Chemical Composition of Steel Sheet]

The chemical composition of the steel sheet according to the present invention will be explained next. The "%" relating to the contents of the elements mean "mass %" unless otherwise indicated. In the numerical ranges in the chemical composition, numerical ranges expressed using "to" mean ranges including the numerical values described before and after the "to" as the lower limit values and the upper limit values unless otherwise indicated.

(C: 0.05 to 0.40%)

C (carbon) is an important element in securing the strength of steel. If the C content is insufficient, sufficient strength is liable to be unable to be secured. Further, due to an insufficient C content, the desired form of the internal oxides will sometimes not be obtainable. Therefore, the C content is 0.05% or more, preferably 0.07% or more, more preferably 0.10% or more, still more preferably 0.12% or more. On the other hand, if the C content is excessive, the weldability is liable to fall. Therefore, the C content is 0.40% or less, preferably 0.35% or less, more preferably 0.30% or less.

(Si: 0.2 to 3.0%)

Si (silicon) is an element effective for raising the strength of steel. If the Si content is insufficient, sufficient strength is liable to be unable to be secured. Furthermore, Si forms oxides together with Mn which thereby function as pinning particles and contribute to refinement of the ferrite phases. That is, if Si is insufficient, the desired fine ferrite phases and their internal oxides are liable to be unable to be sufficiently formed near the surface layer of the steel sheet. Therefore, the Si content is 0.2% or more, preferably 0.3% or more, more preferably 0.5% or more, still more preferably 1.0% or more. On the other hand, if the Si content is excessive, deterioration of the surface properties is liable to be triggered and promotion of external oxide growth is liable to be invited. Therefore, the Si content is 3.0% or less, preferably 2.5% or less, more preferably 2.0% or less.

(Mn: 0.1 to 5.0%)

Mn (manganese) is an element effective for obtaining hard structures and thereby improving the strength of steel. If the Mn content is insufficient, sufficient strength is liable to be unable to be secured. Furthermore, Mn forms oxides together with Si which thereby function as pinning particles and contribute to refinement of the ferrite phases. That is, if Mn is insufficient, the desired fine ferrite phases and their internal oxides are liable to be unable to be sufficiently formed near the surface layer of the steel sheet. Therefore, the Mn content is 0.1% or more, preferably 0.5% or more, more preferably 1.0% or more, still more preferably 1.5% or more. On the other hand, if the Mn content is excessive, Mn segregation causes the metal microstructure to become uneven, the workability is liable to drop, and promotion of external oxide growth is liable to be invited. Therefore, the Mn content is 5.0% or less, preferably 4.5% or less, more preferably 4.0% or less, furthermore preferably 3.5% or less.

(sol. Al: 0.4 to 1.50%)

Al (aluminum) is an element acting as a deoxidizing element. If the Al content is insufficient, a sufficient effect of deoxidation is liable to be unable to be secured. Furthermore, the desired oxides, in particular the internal oxides of the fine ferrite phases, are liable to be unable to be sufficiently formed near the surface layer of the steel sheet. Al is contained in internal oxides together with Si and Mn. These function as pinning particles and contribute to refinement of the ferrite phases. The Al content may be 0.4% or more, but to obtain a sufficient desired effect and obtain internal oxides of fine ferrite phases, the Al content is 0.5% or more, preferably 0.6% or more, more preferably 0.7% or more. On the other hand, if the Al content is excessive, a drop in the workability and deterioration of the surface properties are liable to be triggered, and promotion of external oxide growth is liable to be invited. Therefore, the Al content is 1.50% or less, preferably 1.20% or less, more preferably 0.80% or less. The Al content means the content of so-called acid soluble Al (sol. Al).

(P: 0.0300% or Less)

P (phosphorus) is an impurity generally contained in steel. If the P content is more than 0.0300%, the weldability is liable to fall. Therefore, the P content is 0.0300% or less, preferably 0.0200% or less, more preferably 0.0100% or less, still more preferably 0.0050% or less. The lower limit of the P content is not particularly prescribed, but from the viewpoint of the production costs, the P content may be more than 0% or 0.0001% or more.

(S: 0.0300% or Less)

S (sulfur) is an impurity generally contained in steel. If the S content is more than 0.0300%, the weldability falls and, furthermore, the amount of precipitation of MnS increases and bendability and other workability are liable to fall. Therefore, the S content is 0.0300% or less, preferably 0.0100% or less, more preferably 0.0050% or less, still more preferably 0.0020% or less. The lower limit of the S content is not particularly prescribed, but from the viewpoint of desulfurization costs, the S content may be more than 0% or 0.0001% or more.

(N: 0.0100% or Less)

N (nitrogen) is an impurity generally contained in steel. If the N content is more than 0.0100%, the weldability is liable to fall. Therefore, the N content is 0.0100% or less, preferably 0.0080% or less, more preferably 0.0050% or less, still more preferably 0.0030% or less. The lower limit of the N content is not particularly prescribed, but from the viewpoint of the production costs, the N content may be more than 0% or 0.0010% or more.

(B: 0 to 0.010%)

B (boron) is an element raising the hardenability to contribute to improvement of strength. Further, it is an element segregating at the grain boundaries to strengthen the grain boundaries and improve toughness, so may be contained in accordance with need. Therefore, the B content is 0% or more, preferably 0.001% or more, more preferably 0.002% or more, still more preferably 0.003% or more. On the other hand, from the viewpoint of securing sufficient toughness and weldability, the B content is 0.010% or less, preferably 0.008% or less, more preferably 0.006% or less.
(Ti: 0 to 0.150%)

Ti (titanium) is an element precipitating as TiC during cooling of the steel and contributing to improvement of strength, so may be included in accordance with need. Therefore, the Ti content is 0% or more, preferably 0.001% or more, more preferably 0.003% or more, still more preferably 0.005% or more, further more preferably 0.010% or more. On the other hand, if excessively contained, coarse TiN is produced and the toughness is liable to be damaged, so the Ti content is 0.150% or less, preferably 0.100% or less, more preferably 0.050% or less.
(Nb: 0 to 0.150%)

Nb (niobium) is an element contributing to improvement of strength through improvement of hardenability, so may be contained in accordance with need. Therefore, the Nb content is 0% or more, preferably 0.010% or more, more preferably 0.020% or more, still more preferably 0.030% or more. On the other hand, from the viewpoint of securing sufficient toughness and weldability, the Nb content is 0.150% or less, preferably 0.100% or less, more preferably 0.060% or less.
(V: 0 to 0.150%)

V (vanadium) is an element contributing to improvement of strength through improvement of hardenability, so may be contained in accordance with need. Therefore, the V content is 0% or more, preferably 0.010% or more, more preferably 0.020% or more, still more preferably 0.030% or more. On the other hand, from the viewpoint of securing sufficient toughness and weldability, the V content is 0.150% or less, preferably 0.100% or less, more preferably 0.060% or less.
(Cr: 0 to 2.00%)

Cr (chromium) is effective for raising the hardenability of steel to raise the strength of steel, so may be contained in accordance with need. Therefore, the Cr content is 0% or more, preferably 0.10% or more, more preferably 0.20% or more, still more preferably 0.50% or more, further more preferably 0.80% or more. On the other hand, if excessively contained, a large amount of Cr carbides is formed and conversely the hardenability is liable to be impaired, so the Cr content is 2.00% or less, preferably 1.80% or less, more preferably 1.50% or less.
(Ni: 0 to 2.00%)

Ni (nickel) is effective for raising the hardenability of steel to raise the strength of steel, so may be contained in accordance with need. Therefore, the Ni content is 0% or more, preferably 0.10% or more, more preferably 0.20% or more, still more preferably 0.50% or more, further more preferably 0.80% or more. On the other hand, excessive addition of Ni invites a rise in costs, so the Ni content is 2.00% or less, preferably 1.80% or less, more preferably 1.50% or less.
(Cu: 0 to 2.00%)

Cu (copper) is effective for raising the hardenability of steel to raise the strength of steel, so may be contained in accordance with need. Therefore, the Cu content is 0% or more, preferably 0.10% or more, more preferably 0.20% or more, still more preferably 0.50% or more, further more preferably 0.80% or more. On the other hand, from the viewpoint of keeping down the drop in toughness or fracture of the slab after casting or the drop in weldability, the Cu content is 2.00% or less, preferably 1.80% or less, more preferably 1.50% or less.
(Mo: 0 to 1.00%)

Mo (molybdenum) is effective for raising the hardenability of steel to raise the strength of steel, so may be contained in accordance with need. Therefore, the Mo content is 0% or more, preferably 0.10% or more, more preferably 0.20% or more, still more preferably 0.30% or more. On the other hand, from the viewpoint of suppressing a drop in toughness and weldability, the Mo content is 1.00% or less, preferably 0.90% or less, more preferably 0.80% or less.
(W: 0 to 1.00%)

W (tungsten) is effective for raising the hardenability of steel to raise the strength of steel, so may be contained in accordance with need. Therefore, the W content is 0% or more, preferably 0.10% or more, more preferably 0.20% or more, still more preferably 0.30% or more. On the other hand, from the viewpoint of keeping the toughness and weldability from falling, the W content is 1.00% or less, preferably 0.90% or less, more preferably 0.80% or less.
(Ca: 0 to 0.100%)

Ca (calcium) is an element having the action of contributing to control of inclusions, in particular finer dispersion of inclusions, and raising the toughness, so may be contained in accordance with need. Therefore, the Ca content is 0% or more, preferably 0.001% or more, more preferably 0.005% or more, still more preferably 0.010% or more, further more preferably 0.020% or more. On the other hand, if excessively contained, deterioration of the surface properties sometimes appears, so the Ca content is 0.100% or less, preferably 0.080% or less, more preferably 0.050% or less.
(Mg: 0 to 0.100%)

Mg (magnesium) is an element having the action of contributing to control of inclusions, in particular finer dispersion of inclusions, and raising the toughness, so may be contained in accordance with need. Therefore, the Mg content is 0% or more, preferably 0.001% or more, more preferably 0.003% or more, still more preferably 0.010% or more. On the other hand, if excessively contained, deterioration of the surface properties sometimes appears, so the Mg content is 0.100% or less, preferably 0.090% or less, more preferably 0.080% or less.
(Zr: 0 to 0.100%)

Zr (zirconium) is an element having the action of contributing to control of inclusions, in particular finer dispersion of inclusions, and raising the toughness, so may be contained in accordance with need. Therefore, the Zr content is 0% or more, preferably 0.001% or more, more preferably 0.005% or more, still more preferably 0.010% or more. On the other hand, if excessively contained, deterioration of the surface properties sometimes appears, so the Zr content is 0.100% or less, preferably 0.050% or less, more preferably 0.030% or less.
(Hf: 0 to 0.100%)

Hf (hafnium) is an element having the action of contributing to control of inclusions, in particular finer dispersion of inclusions, and raising the toughness, so may be contained in accordance with need. Therefore, the Hf content is 0% or more, preferably 0.001% or more, more preferably 0.005% or more, still more preferably 0.010% or more. On the other hand, if excessively contained, deterioration of the surface properties sometimes appears, so the Hf content is 0.100% or less, preferably 0.050% or less, more preferably 0.030% or less.

(REM: 0 to 0.100%)

A REM (rare earth metal) is an element having the action of contributing to control of inclusions, in particular finer dispersion of inclusions, and raising the toughness, so may be contained in accordance with need. Therefore, the REM content is 0% or more, preferably 0.001% or more, more preferably 0.005% or more, still more preferably 0.010% or more. On the other hand, if excessively contained, deterioration of the surface properties sometimes appears, so the REM content is 0.100% or less, preferably 0.050% or less, more preferably 0.030% or less. Note that, "REM" is an abbreviation for "rare earth metal" and means an element belonging to the lanthanoids. A REM is usually added as a mischmetal.

In the steel sheet according to the present invention, the balance other than the above chemical composition is comprised of Fe and impurities. Here, "impurities" means constituents entering due to various factors in the production process such as, first and foremost, the raw materials such as ore and scrap, when industrially producing steel sheet, and contained in a range not having a detrimental effect on the properties of the steel sheet according to the present invention.

In the present invention, the chemical composition of the steel sheet may be analyzed using an elemental analysis method known to persons skilled in the art. For example, it is performed by inductively coupled plasma mass spectrometry (ICP-MS). However, for C and S, the combustion-infrared absorption method may be used, while for N, the inert gas melting-thermal conductivity method may be used. These analyses may be performed by samples of steel sheet taken by a method compliant with JIS G0417: 1999.

Further, regarding the amount of sol. Al, this may be measured by the following procedure. Specifically, the steel sheet is electrolyzed and the residue recovered by filter paper is analyzed by inductively coupled plasma mass spectrometry. The detected Al amount is deemed the precipitated Al amount. On the other hand, the T. Al (also referred to as the "total Al") is measured without electrolyzing the steel sheet. The value of the T. Al minus the precipitated Al amount is defined as the sol. Al.

[Surface Layer]

In the present invention, the "surface layer" of steel sheet means the region from the surface of the steel sheet (in case of plated steel sheet, the interface of the steel sheet and plating layer) down to a predetermined depth in the sheet thickness direction. The "predetermined depth" is typically 50 μm or less. Note that, the shapes, number densities, etc. of the fine ferrite phases and their internal oxides according to the present embodiment are measured in the "surface layer" in the range from the surface of the steel sheet (interface of plating layer/steel sheet) down to a depth of 2 μm toward the steel sheet side. This range will sometimes be referred to as "near the surface layer".

As illustrated in the FIGURE, in the plated steel sheet according to the present embodiment, fine ferrite phases and their internal oxides are present at the surface layer of the steel sheet.

[Ferrite Phases]

In the present embodiment, "ferrite phases" means crystal phases forming the steel matrix and having the crystal structures of ferrite. In actuality, ferrite phases are typically present three-dimensionally as spherical shapes or substantially spherical shapes at the surface layer of the steel sheet, so if examining the cross section of the surface layer of the steel sheet, the ferrite phases are typically observed as circular shapes or substantially circular shapes.

(Circle Equivalent Diameters of Ferrite Phases)

In the present embodiment, the ferrite phases have circle equivalent diameters of 1 μm (1000 nm) or less. This range of ferrite phases will sometimes be referred to as "fine ferrite phases". By controlling the circle equivalent diameters to such a range, it is possible to make fine ferrite phases disperse to near the surface layer of the steel sheet. The internal oxides of the fine ferrite phases function well as trap sites for Zn potentially penetrating at the time of hot stamping or welding plated steel sheet comprised of steel sheet and a plating layer formed on the same. On the other hand, if the circle equivalent diameters become more than 1 μm (1000 nm), the number of ferrite phases sometimes fall and the desired number density is liable to be unable to be obtained. The circle equivalent diameters of the ferrite phases are not particularly prescribed, but may be 2 nm or more, preferably 10 nm or more, so as to include the later explained internal oxides.

(Number Density of Ferrite Phases)

In the present embodiment, near the surface layer (region from surface layer down to depth of 2 μm), the number density of the fine ferrite phases is 2 to 30/μm². By controlling the number density to such a range, it is possible to make a large amount of fine ferrite phases disperse at the surface layer of the steel sheet. Inside, internal oxides can be contained. The internal oxides function well as trap sites for Zn potentially penetrating when hot stamping or welding plated steel sheet comprised of steel sheet and a plating layer formed on it. The circle equivalent diameters of the ferrite phases are fine (circle equivalent diameters 1 μm or less), so (compared with coarse ferrite phases), the Zn penetrating the ferrite phases quickly reach the internal oxides where the Zn is quickly trapped. Conversely, if the ferrite phases are coarse, the Zn penetrating the ferrite phases require time until reaching the internal oxides and the Zn is sometimes not trapped. Therefore, if the number density of the ferrite phases is less than 2/μm², the relatively coarse ferrite phases become more numerous, much of the internal oxides functioning as trap sites of Zn become present in the coarse ferrite phases and do not sufficiently function as trap sites of Zn, and excellent LME resistance is liable to be unable to be obtained. The number density of fine ferrite phases is preferably 3/μm² or more, more preferably 4/μm² or more, still more preferably 5/μm² or more. Fine ferrite phases surround the internal oxides functioning as trap sites for Zn. From this viewpoint, the greater the amount they are present in, the more preferable. However, under general manufacturing conditions, the upper limit of the number density of fine ferrite phases becomes 30/μm² or less, so the upper limit of the number density of fine ferrite phases in the present embodiment is 30/μm² or less and may also be 25/μm² or less and 20/μm² or less.

The size (circle equivalent diameter) and number density of the ferrite phases are measured by a scan type electron microscope (SEM) and transmission type electron microscope (TEM). The specific measurements are performed as follows: A cross section of the surface layer of the steel sheet is examined under an SEM to obtain an SEM image containing the ferrite phases. Based on the cross-sectional SEM image, a test piece for TEM examination is taken using FIB processing so as to include the interface of the plating layer/steel sheet. In the TEM examination, the ferrite phases falling under the shapes shown in the present embodiment (circle equivalent diameter 1 μm or less) are identified in the range from the steel sheet surface (interface of plating layer/steel sheet) to a depth of 2 μm to the steel sheet side and their number density is measured. As the examination position, the position is made 2.0 μm from the steel sheet surface in the depth direction (direction vertical to surface of steel sheet) and is made 1.0 μm of any position of the TEM image in the width direction (direction parallel to surface of steel sheet). In other words, the examined field is 2.0 μm×1.0 μm. Next, the TEM images of the fields obtained in the above way are extracted and digitalized for separating the ferrite phases (and grain boundaries (or phase boundaries)), the areas of the ferrite phases are calculated from the digitalized images, the circle equivalent sizes (nm) of the ferrite phases are found as diameters of circles having equal areas to those areas, that is, circle equivalent diameters, and phases having circle equivalent diameters of 1 μm or less (1000 nm or less) in range are deemed fine ferrite phases according to the present embodiment. Furthermore, the numbers of the fine ferrite phases in the digitalized images are counted. The average value of the numbers of fine ferrite phases in the total of 10 regions found in this way is defined as the number density (/μm$^2$) of fine ferrite phases. Note that, if only parts of the ferrite phases are observed in examined regions, that is, if not all of the contours of the ferrite phases are inside the examined regions, these are not counted in the numbers.

[Internal Oxides]

In the present embodiment, "internal oxides" mean oxides present inside the above-mentioned fine "ferrite phases". Several internal oxides may be present in a single ferrite phase. The internal oxides are not arranged in position following any specific rules (for example, in a line) and may be arranged at random.

(Particle Size of Internal Oxides)

In the present embodiment, the particle size of the internal oxides is a circle equivalent diameter of 2 nm or more and 100 nm or less. By controlling the particle size to such a range, it is possible to make the internal oxides disperse in the fine ferrite phases present near the surface layer of the steel sheet. The internal oxides function well as trap sites of the Zn potentially penetrating at the time of hot stamping or welding plated steel sheet comprised of steel sheet and a plating layer formed on the same. On the other hand, if the particle size becomes more than 100 nm, the number of internal oxides sometimes falls and the desired number density is liable to be unable to be obtained. The finer the internal oxides, the higher the specific surface area and the more improved the reactivity as trap sites, so the particle size of the internal oxides may be 50 nm or less, preferably 20 nm or less or less than 20 nm. On the other hand, the lower limit is 2 nm or more. The reason is that the amount of Zn which one particle can trap falls, Zn cannot be sufficiently trapped, and the internal oxides are liable to not sufficiently function as trap sites of Zn The shape of the internal oxides is not particularly limited, but the aspect ratio (maximum line segment length crossing an internal oxide (long axis)/maximum line segment length crossing the oxide vertical to the long axis (short axis)) may be 1.5 or more. The short axis may also be less than 20 nm. While being bound to a specific theory is not desirable, if the aspect ratios of the internal oxides become higher, the possibility of contacting Zn penetrating the ferrite phases rises and, it is believed, the trap efficiency of Zn rises.

(Number Density of Internal Oxides)

Further, the number density of internal oxides is 3/μm$^2$ or more. By controlling the number density to such a range, it is possible to make a large amount of internal oxides be surrounded by the fine ferrite phases present at the surface layer of the steel sheet. The internal oxides of the fine ferrite phases function well as trap sites for Zn potentially penetrating at the time of hot stamping or welding plated steel sheet comprised of steel sheet and a plating layer formed on the same. On the other hand, if the number density is less than 3/μm$^2$, the number density is not sufficient for trap sites of Zn, the internal oxides do not sufficiently function as trap sites of Zn. and good LME resistance is liable to be unable to be obtained. The number density of internal oxides is preferably 6/μm$^2$ or more, more preferably 8/μm$^2$ or more, still more preferably 10/μm$^2$ or more. From the viewpoint of the internal oxides functioning as trap sites of Zn, the larger the amount present, the better, but the circle equivalent diameters of the ferrite phases surrounding the internal oxides are 1 μm or less, so there is no need to set an upper limit on the number density of internal oxides. 30/μm$^2$ or less, 25/μm$^2$ or less, or 20/μm$^2$ or less are also possible.

The particle sizes and number density of the internal oxides are measured by a scan type electron microscope (SEM) and transmission type electron microscope (TEM) by a technique similar to the ferrite phases. The specific measurements are performed as follows: A cross section of the surface layer of the steel sheet is examined under an SEM to obtain an SEM image containing the ferrite phases. Based on the cross-sectional SEM image, a test piece for TEM examination is taken using FIB processing so as to include the interface of the plating layer/steel sheet. In the TEM examination, the internal oxides falling under the shapes shown in the present embodiment (circle equivalent diameter 2 to 100 μm) are identified in the range from the steel sheet surface (interface of plating layer/steel sheet) to a depth of 2 μm to the steel sheet side and their number density is measured. As the examination position, the position is made 2.0 μm from the steel sheet surface in the depth direction (direction vertical to surface of steel sheet) and is made 1.0 μm of any position of the TEM image in the width direction (direction parallel to surface of steel sheet). In other words, the examined field region is 2.0 μm×1.0 μm. Next, the TEM images of the regions obtained in the above way are extracted and digitalized for separating the oxide parts and steel parts, the areas of the oxide parts are calculated from the digitalized images, the particle sizes (nm) of the internal oxides are found as diameters of circles having equal areas to those areas, that is, circle equivalent diameters, and internal oxides having particle sizes of 2 nm or more and 100 nm or less in range are deemed internal oxides according to the present embodiment. Furthermore, the numbers of the internal oxides in the digitalized images are counted. The average value of the numbers of internal oxides in the total of 10 regions found in this way is defined as the number density (/μm$^2$) of internal oxides. Note that, if only parts of the internal oxides are observed in examined regions, that is, if not all of the contours of the internal oxides are inside the examined regions, these are not counted in the numbers.

[Chemical Composition of Oxides]

In the present invention, the internal oxides (below, also simply referred to as "oxides") contain, in addition to oxygen, one or more of the elements included in the above-mentioned steel sheet. Typically, they have a chemical composition including Si, O, and Fe and sometimes furthermore Mn or Al. The oxides may also contain elements able to be contained in the above-mentioned steel sheet (for example, Cr etc.) in addition to these elements. While being bound to a specific theory is not desirable, if Al is included in the oxides, it is believed that the effect as trap sites of Zn will become higher. A higher content of Al contained in the internal oxides is desirable and may be 20 mass % or more. If the internal oxides are oxides of Al and O, so-called alumina, the Al content in the oxides becomes the highest or becomes 53 mass %. This may be made the upper limit of the Al content.

<Plated Steel Sheet>

The plated steel sheet according to the present invention has the above-mentioned steel sheet according to the present invention and a plating layer containing Zn on the same. This plating layer may be formed on one surface of the steel sheet and may be formed on both surfaces. As the plating layer containing Zn, for example, a hot dip galvanized layer, hot dip galvannealed layer, electrogalvanized layer, electrogalvannealed layer, etc. may be mentioned. More specifically, as the plating type, for example. Zn-0.2% Al(GI), Zn-(0.3 to 1.5)% Al, Zn-4.5% Al, Zn-0.09% Al-10% Fe(GA), Zn-1.5% Al-1.5% Mg, or Zn-11% Al-3% Mg-0.2% Si, Zn-11% Ni, Zn-15% Mg, etc. can be used.

[Chemical Composition of Plating Layer]

The chemical composition of the plating layer containing Zn in the present invention will be explained next. The "%" relating to the contents of the elements mean "mass %" unless otherwise indicated. In the numerical ranges in the chemical composition, numerical ranges expressed using "to" mean ranges including the numerical values described before and after the "to" as the lower limit values and the upper limit values unless otherwise indicated.

(Al: 0) to 60.0%)

Al is an element causing improvement of the corrosion resistance of the plating layer by inclusion or alloying together with Zn, so may be contained in accordance with need. Therefore, the Al content may also be 0%. To form a plating layer containing Zn and Al, preferably the Al content may be 0.01% or more. For example, it may also be 0.1% or more, 0.3% or more, 0.5% or more, 1.0% or more, or 3.0% or more. On the other hand, if more than 60.0%, the effect of causing improvement of the corrosion resistance becomes saturated, so the Al content may be 60.0% or less. For example, it may be 55.0% or less, 50.0% or less, 40.0% or less, 30.0% or less, 20.0% or less, 10.0% or less, or 5.0% or less. The detailed mechanism is not clear, but if the Al in the plating layer is 0.3 to 1.5% in range, due to the effect of the Al, the speed of penetration of Zn into the steel grain boundaries is greatly reduced and the LME resistance can be made to be improved. Therefore, from the viewpoint of improvement of the LME resistance, the Al in the plating layer is preferably 0.3 to 1.5%. On the other hand, in electroplating, the basis weight is easily controlled by the amount of electricity, so the Al in the plating layer may be made 0 to less than 0.1%. If the Al composition in the plating layer is 0) to less than 0.1%, the alloying speed of the plating layer and the base iron is fast and during welding. Zn diffuses quickly in the plating layer not only at the steel grain boundaries, but also into the grains. As a result, concentrated penetration of Zn into the steel grain boundaries is suppressed and the LME resistance can be made to be improved. Typically, the plating layer may be a chemical composition containing, by mass %, Al: 0.3 to 1.5% and having a balance of Zn and impurities. The plating layer may also be a chemical composition containing, by mass %, Al: 0 to less than 0.1% and having a balance of Zn and impurities. Due to the plating layer of such ranges of chemical compositions, the LME resistance can be further improved.

(Mg: 0) to 15.0%)

Mg is an element included or alloyed together with Zn and Al to thereby improve the corrosion resistance of the plating layer, so may be contained in accordance with need. Therefore, the Mg content may also be 0%. To form a plating layer containing Zn, Al, and Mg, preferably the Mg content may be made 0.01% or more. For example, it may be 0.1% or more. 0.5% or more, 1.0% or more, or 3.0% or more. On the other hand, if more than 15.0%, Mg will not dissolve into the plating bath and will float up as oxides. If galvanizing in this plating bath, oxides will deposit on the plating surface layer and cause poor appearance. Alternatively, nonplating parts will be liable to be formed. Therefore, the Mg content may be 15.0% or less. For example, it may be 10.0% or less and 5.0% or less.

(Fe: 0 to 15.0%)

Fe diffuses from the steel sheet if heat treating the plated steel sheet after forming a plating layer containing Zn on the steel sheet and can be included in the plating layer. Therefore, in a state where no heat treatment is performed, since Fe is not contained in the plating layer, the Fe content may also be 0%. Further, the Fe content may be 1.0% or more, 2.0% or more, 3.0% or more, 4.0% or more, or 5.0% or more. On the other hand, the Fe content may be 15.0% or less. For example, it may also be 12.0% or less, 10.0% or less, 8.0% or less, or 6.0% or less.

(Si: 0 to 3.0%)

Si is an element further causing improvement of the corrosion resistance if included in the plating layer containing Zn, in particular a Zn—Al—Mg plating layer, so may be contained in accordance with need. Therefore, the Si content may also be 0%. From the viewpoint of improvement of the corrosion resistance, the Si content may be, for example, 0.005% or more, 0.01% or more, 0.05% or more, 0.1% or more, or 0.5% or more. Further, the Si content may be 3.0% or less, 2.5% or less, 2.0% or less, 1.5% or less, or 1.2% or less.

The basic chemical composition of the plating layer is as explained above. Furthermore, the plating layer may optionally contain one or more of Sb: 0 to 0.50%, Pb: 0 to 0.50%, Cu: 0 to 1.00%, Sn: 0 to 1.00%, Ti: 0 to 1.00%, Sr: 0 to 0.50%, Cr: 0 to 1.00%, Ni: 0 to 1.00%, and Mn: 0 to 1.00%. While not particularly limited, from the viewpoint of causing the actions and functions of the basic constituents forming the plating layer to sufficiently be manifested, the total content of these optional elements is preferably made 5.00% or less. Making it 2.00% or less is more preferable.

In the plating layer, the balance besides the above constituents is comprised of Zn and impurities. The "impurities" in the plating layer means constituents entering due to various factors in the production process such as, first and foremost, the raw materials, when producing the plating layer and not intentionally added to the plating layer. In the plating layer, as impurities, elements besides the basic constituents and optional constituents explained above may also be include in trace amounts within a range not obstructing the effect of the present invention.

The chemical composition of the plating layer can be determined by dissolving the plating layer in an acid solution containing an inhibitor for inhibiting corrosion of the steel sheet and measuring the obtained solution by ICP (inductively coupled plasma) mass spectrometry.

The thickness of the plating layer may be, for example, 3 to 50 μm. Further, the amount of deposition of the plating layer is not particularly limited, but for example may be 10 to 170 g/m² per side. In the present invention, the amount of deposition of the plating layer is determined by dissolving the plating layer in an acid solution containing an inhibitor for inhibiting corrosion of the base iron and measuring the change in weight before and after dissolving the plating.

[Tensile Strength]

The steel sheet and plated steel sheet according to the present invention preferably have high strength. Specifically, this indicates having a 780 MPa or more tensile strength. For example, the tensile strength may be 780 MPa or more, 800 MPa or more, or 900 MPa or more. The upper limit of the tensile strength is not particularly prescribed, but from the viewpoint of securing the toughness, for example, it may be 2000 MPa or less. The tensile strength may be measured by obtaining a JIS No. 5 tensile test piece and running a test compliant with JIS Z 2241(2011). The long direction of the tensile test piece is not particularly limited and may be a direction perpendicular to the rolling direction as well.

The plated steel sheet according to the present invention is high in strength and has high LME resistance, so can be suitably used in automobiles, household electrical appliances, building materials, and other broad ranged fields, but is particularly preferably used in the automotive field. Steel sheet and plated steel sheet used for automobiles are often hot stamped. In that case, LME fracture can become a conspicuous problem. For this reason, if using the plated steel sheet according to the present invention as steel sheet for automotive use, the effect of the present invention of having a high LME resistance is optimally manifested.

<Method of Production of Steel Sheet>

Below, the preferable method of production of the steel sheet according to the present invention will be explained. The following explanation is intended to illustrate the characterizing method for producing the steel sheet according to the present invention and is not intended to limit the steel sheet to one produced by the method of production such as explained below.

The steel sheet according to the present invention can, for example, be obtained by a casting step of casting molten steel adjusted in chemical composition so as to form a steel slab, a hot rolling step of hot rolling the steel slab to obtain hot rolled steel sheet, a coiling step of coiling the hot rolled steel sheet, a cold rolling step of cold rolling the coiled hot rolled steel sheet to obtain cold rolled steel sheet, a pickling step of pickling the cold rolled steel sheet, a pretreatment step of brush grinding the pickled cold rolled steel sheet, and an annealing step of annealing the pretreated cold rolled steel sheet. Alternatively, it is possible to not coil the steel sheet after the hot rolling step, but to pickle it and perform the cold rolling step as is.

[Casting Step]

The conditions of the casting step are not particularly limited. For example, after smelting in a blast furnace, electric furnace, etc., various types of secondary refining may be performed, then the steel cast by the usual continuous casting, casting by the ingot method, or another method.

[Hot Rolling Step]

The steel slab cast in the above way can be hot rolled to obtain hot rolled steel sheet. The hot rolling step is performed by directly hot rolling the cast steel slab or by reheating it after cooling once. If reheating, the heating temperature of the steel slab may be, for example, 1100° C. to 1250° C. In the hot rolling step, usually rough rolling and finish rolling are performed. The temperatures and rolling reductions in the rolling steps may be suitably changed in accordance with the desired metal microstructure and sheet thickness. For example, the end temperature of the finish rolling may be made 900 to 1050° C., and the rolling reduction of the finish rolling may be made 10 to 50%.

[Coiling Step]

The hot rolled steel sheet can be coiled at a predetermined temperature. The coiling temperature may be suitably changed in accordance with the desired metal microstructure etc. For example, it may be 500 to 800° C. Before coiling or after coiling, then uncoiling, the hot rolled steel sheet may be subjected to predetermined heat treatment. Alternatively, it is possible to not perform the coiling step, but to pickle the steel sheet after hot rolling and perform the later explained cold rolling step as is.

[Cold Rolling Step]

After pickling the hot rolled steel sheet etc., the hot rolled steel sheet can be cold rolled to obtain cold rolled steel sheet. The rolling reduction of the cold rolling may be suitably changed in accordance with the desired metal microstructure and sheet thickness. For example, it may be 20 to 80%. After the cold rolling step, for example, the steel sheet may be air cooled to cool it down to room temperature.

[Pretreatment Step]

To obtain fine ferrite phases and their internal oxides at the finally obtained surface layer of the steel sheet, it is effective to perform predetermined pretreatment before annealing the cold rolled steel sheet. In the pretreatment step, it becomes possible to more effectively introduce strain into the steel sheet. Due to the strain, dislocations in the metal microstructure of the steel sheet are promoted. At the time of annealing, oxygen easily penetrates the inside of the steel along the dislocations whereby oxides become easily formed inside of the steel sheet. As a result, this becomes advantageous for increasing the number density of internal oxides of the ferrite phases. Further, internal oxides function as pinning particles and contribute to making the ferrite phases finer. Accordingly, if performing such a predetermined step, the desired fine ferrite phases and their internal oxides are easily formed in the later explained annealing step. The pretreatment step includes grinding the cold rolled steel sheet surface by a heavy descaling grinding brush (brush grinding). As the heavy descaling grinding brush. D-100 made by Hotani may be used. At the time of grinding, the steel sheet surface may be coated with an NaOH 1.0 to 5.0% aqueous solution. The brush reduction may be 0.5 to 10.0 mm and the speed 100 to 1000 rpm. By performing brush grinding controlled to such a coating solution condition, brush reduction, and speed, in the later explained annealing step, fine ferrite phases and their internal oxides can be efficiently formed near the surface layer of the steel sheet.

[Annealing Step]

After the above pretreatment step, the cold rolled steel sheet is annealed. The annealing is preferably performed in a state, for example, applying 0.1 to 20 MPa tension. If applying tension at the time of annealing, it becomes possible to more effectively introduce strain into the steel sheet. Due to the strain, dislocations of the metal structure of the steel sheet are promoted. Oxygen easily penetrates inside the steel along the dislocations whereby oxides are easily formed inside the steel sheet. As a result, this becomes advantageous for increasing the number density of internal oxides of the fine ferrite phases.

From the viewpoint of causing the formation of fine ferrite phases and their internal oxides, the holding temperature in the annealing step may be 700° C., to 900° C. If the holding temperature of the annealing step is less than 700° C., internal oxides are liable to be unable to be formed in a sufficiently large amount. Further, the pinning effect of the ferrite phase grain boundaries by the internal oxides is insufficient and sometimes the ferrite phases coarsen. For this reason, sometimes the LME resistance becomes insufficient. On the other hand, if the holding temperature in the annealing step is more than 900° C., the internal oxides are liable to coarsen and the desired internal oxides are liable to not be formed. Further, if more than 900° C. even if internal oxides are formed, sometimes the ferrite phases will rapidly grow and the desired fine ferrite phases will be unable to be obtained. For this reason, sometimes the LME resistance will become insufficient. The rate of temperature rise up to the holding temperature is not particularly limited but may be 1 to 10° C./s. Further, the temperature rise may be performed in two stages of a first rate of temperature rise of 1 to 10° C./s and a second rate of temperature rise of 1 to 10° C./s different from the first rate of temperature rise.

The holding time at the holding temperature of the annealing step may be 0 to 300 seconds, preferably is 50 to 130 seconds. A holding time of 0 second means heat treatment at a predetermined dew point and, right after reaching a predetermined temperature, cooling without holding at an equal temperature. Even if the holding time is 0 second, during the temperature raising process, internal oxides are formed and LME resistance can be obtained. On the other hand, if the holding time is more than 300 seconds, the internal oxides are liable to coarsen and a sufficiently large amount of internal oxides is liable to not be formed. Further, the pinning effect of the ferrite phase grain boundaries by the internal oxides sometimes becomes insufficient and the ferrite phases coarsen. For this reason, sometimes the LME resistance becomes insufficient.

During a rising temperature and during holding (equal temperature) of the annealing step, humidification is performed from the viewpoint of causing the formation of fine ferrite phases and their internal oxides. The humidification is started during the rising temperature, at least from 300° C. At 300° C., or more, the dislocations in the ferrite phases of the steel sheet act as routes for diffusion of oxygen. Formation of internal oxides inside the ferrite phases is promoted by the oxygen contained in the humidification atmosphere. In general, humidifying while raising the temperature from 300° C., or so to the holding temperature promotes the formation of an external oxidation film and causes a drop in plateability, so a person skilled in the art would avoid humidification from such a temperature raising process. Further, if the temperature for starting humidification is more than 300° C., in particular is a temperature close to the holding temperature, for example, a temperature of 700° C., or so, the dislocations in the ferrite phases will be recovered from and disappear, so internal oxides will not be sufficiently formed inside the ferrite phases.

The atmosphere for humidification has a dew point of more than 10° C., and 20° C., or less, preferably 11 to 20° C., and has a hydrogen concentration of 8 to 20 vol % $H_2$, preferably 10 vol % $H_2$. Note that the dew point before humidification is −40 to −60° C. After that, steam is introduced to control the dew point to a predetermined value. If the dew point is too low, the internal oxidation layer is liable to not be sufficiently formed. Further, the pinning effect of the ferrite phase grain boundaries by the internal oxides will sometimes be insufficient and the ferrite phases will sometimes coarsen. For this reason, sometimes the LME resistance will become insufficient. On the other hand, if the dew point is too high, an external oxidation layer will sometimes form on the surface of the steel sheet and a plating layer will be unable to be obtained. Further, even within the above dew point range, if the hydrogen concentration is too low, the oxygen potential will become excessive and sometimes an external oxidation layer will be formed resulting in the plating layer not being obtained or further the internal oxidation layer will not be sufficiently formed. For this reason, the LME resistance will sometimes become insufficient. On the other hand, if the hydrogen concentration is too high, the oxygen potential will become insufficient, an internal oxidation layer will not be sufficiently formed, and an external oxidation layer is liable to be formed and a plating layer to not be obtained. Further, if internal oxides are not formed in a sufficiently large amount, the pinning effect of the ferrite phase grain boundaries by the internal oxides will sometimes be insufficient and the ferrite phases will sometimes coarsen. For this reason, the LME resistance will sometimes become insufficient.

Furthermore, it is effective to remove the internal oxidation layer of steel sheet when performing an annealing step, in particular before brush grinding. During the above-mentioned rolling steps, in particular during the hot rolling step, sometimes an internal oxidation layer is formed at the surface layer of the steel sheet. The internal oxidation layer formed in such rolling steps is liable to obstruct the formation of internal oxides in the annealing step. Further, the pinning effect of the ferrite phase grain boundaries by the internal oxides is liable to be insufficient and ferrite phases to coarsen, so the internal oxidation layer is preferably removed by pickling etc. More specifically, the depth of the internal oxidation layer of cold rolled steel sheet at the time of performing the annealing step is may be made 0.5 µm or less, preferably 0.3 µm or less, more preferably 0.2 µm or less, still more preferably 0.1 µm.

By performing the above-mentioned steps, steel sheet formed with fine ferrite phases and their internal oxides at the surface layer of the steel sheet can be obtained.

<Method of Production of Plated Steel Sheet>

Below, the preferable method of production of the plated steel sheet according to the present invention will be explained. The following explanation is intended to illustrate the characterizing method for producing the plated steel sheet according to the present invention and is not intended to limit the plated steel sheet to one produced by the method of production such as explained below.

The plated steel sheet according to the present invention can be obtained by performing a plating step forming a plating layer containing Zn on steel sheet produced as explained above.

[Plating Step]

The plating step may be performed in accordance with a method known to persons skilled in the art. The plating step may, for example, be performed by hot dip coating and may be performed by electroplating. Preferably, the plating step is performed by hot dip coating. The conditions of the plating step may be suitably set considering the chemical composition, thickness, amount of deposition, etc. of the desired plating layer. After the plating, alloying may be performed. Typically, the conditions of the plating step are set so as to form a plating layer containing Al: 0 to 60.0%, Mg: 0 to 15.0%, Fe: 0 to 15%, Ni: 0 to 20%, and Si: 0 to 3% and having a balance of Zn and impurities. More specifically, the conditions of the plating step may be suitably set so as to form, for example, Zn-0.2% Al (GI), Zn-0.8% Al, Zn-4.5% Al, Zn-0.09% Al-10% Fe (GA), Zn-1.5% Al-1.5% Mg, or Zn-11% Al-3% Mg-0.2% Si, Zn-11% Ni, and Zn-15% Mg. From the viewpoint of improvement of the LME resistance, the Al of the plating layer is desirably 0.3 to 1.5%.

EXAMPLES

Below, examples will be used to explain the present invention in more detail, but the present invention is not limited to these examples in any way.

In the examples and comparative examples of the plated steel sheet, the samples were fabricated by the following procedure unless particularly indicated otherwise. In some of the comparative examples etc., the specific conditions employed are explained separately.

(Fabrication of Steel Sheet Samples) Each molten steel adjusted in chemical composition was cast to form a steel slab. The steel slab was hot rolled, pickled, then cold rolled to obtain cold rolled steel sheet. Next, this was air cooled down to room temperature. The cold rolled steel sheet was pickled to remove the internal oxidation layer formed by the rolling down to the depth of the internal oxidation layer (μm) before annealing shown in Table 1. Next, a sample was taken from each cold rolled steel sheet by a method compliant with JIS G0417: 1999. The chemical composition of each steel sheet was analyzed by the ICP-MS method etc. The measured chemical composition of each steel sheet is shown in Table 1. The thicknesses of the steel sheets used were in all cases 1.6 mm.

Next, some of the cold rolled steel sheets were coated with an NaOH 2.0% aqueous solution and pretreated by brush grinding using a heavy descaling grinding brush (D-100 made by Hotani) by a brush reduction of 2.0 mm and speed 600 rpm. After that, they were annealed by the hydrogen concentration, dew points, holding temperatures, and holding times shown in Tables 1 and 2 to prepare steel sheet samples. The presence of any pretreatment and the conditions of the annealing (humidifying zone, hydrogen concentration (%), dew point (° C.), holding temperature (° C.), and holding time (s)) are shown in Tables 1 and 2. The "rising temperature" in the column of the humidifying zone means humidification in the period from 300° C., or more to the holding temperature by the atmosphere of the above-mentioned hydrogen concentration and dew point, while "equal temperature" in the column of humidification means humidification during the holding time by the atmosphere of the above-mentioned hydrogen concentration and dew point. The rate of temperature rise at the time of annealing was made 1 to 10° C./s. In the annealing, the annealing was performed in the state applying 0.1 to 20 MPa or more tension to the cold rolled steel sheet in the rolling direction. Note that, in each steel sheet sample, a JIS No. 5 tensile test piece having a direction perpendicular to the rolling direction as the long direction was obtained and the tensile test performed compliant with JIS Z 2241(2011). The result for No. 1 was a tensile strength of less than 440 MPa. For the rest, it was 440 MPa or more.

(Preparation of Plated Steel Sheet Samples)

Each obtained steel sheet sample was cut to 100 mm×200 mm size, then plated for forming the plating type shown in Tables 1 and 2 to thereby prepare a plated steel sheet sample. In Tables 1 and 2, the plating type "a" means "hot dip galvannealed sheet (GA)", the plating type "b" means "hot dip galvanized-0.2% Al plated steel sheet (GI)", the plating type "c" means "hot dip galvanized-(0.3 to 1.5)% Al plated steel sheet (Al contents described in Tables 1 and 2)", and the plating type "d" means "electrogalvanization (Al composition less than 0.01%)". In the hot dip galvanization step, the cut sample was dipped in a 440° C. hot dip galvanization bath for 3 seconds. After dipping, it was pulled out at 100 mm/s and controlled to an amount of plating deposition of 50 g/m$^2$ by N$_2$ wiping gas. For the plating type "a", alloying was subsequently performed at 500° C.

Each obtained plated steel sheet sample was evaluated for different evaluation items by the following evaluation methods. In the same way as above, for No. 1, the tensile strength was less than 440 MPa, while it was 440 MPa or more for the others. Regarding the LME resistance, in the plating type "c", if the Al content was 0.3 to 1.5 mass %, the LME resistance was improved. The results are shown in Table 2.

(Analysis of Surface Layer of Steel Sheet Samples: Number Density of Fine Ferrite Phases)

Each steel sheet sample prepared in the above way was cut to 25 mm×15 mm. The cut sample was buried in resin and polished to a mirror surface. The cross section of each steel sheet sample was examined by an SEM. From the cross-sectional SEM image, a test piece for TEM examination was taken using FIB processing so as to include the interface of the plating layer/steel sheet. In the TEM examination, the ferrite phases falling under the shapes shown in the present application were identified in the range from the steel sheet surface (interface of plating layer/steel sheet) to a depth of 2 μm to the steel sheet side and their number density was measured. As the examination position, the position was made 2.0 μm from the steel sheet surface in the depth direction (direction vertical to surface of steel sheet) and was made 1.0 μm of any position of the TEM image in the width direction (direction parallel to surface of steel sheet). Next, the TEM images of the regions of the steel sheet samples obtained were digitalized, the areas of the ferrite phases were calculated from the digitalized images, the circle equivalent sizes (nm) of the ferrite phases were found as diameters of circles having equal areas to those areas, that is, circle equivalent diameters, and phases having circle equivalent diameters of 1 μm or less in range were deemed fine ferrite phases. Furthermore, the numbers of the fine ferrite phases in the TEM images were counted. The average value of the numbers of fine ferrite phases in the total of 10 digitalized images found in this way was defined as the number density (/μm$^2$) of fine ferrite phases. The number densities (/μm$^2$) of the fine ferrite phases in the steel sheet samples are shown in Tables 1 and 2.

(Analysis of Surface Layer of Steel Sheet Samples: Number Density of Internal Oxides)

Each steel sheet sample prepared as explained above was cut into 25 mm×15 mm, the cut sample was buried in a resin and polished to a mirror finish, and the cross section of each steel sheet was examined by an SEM. Based on the cross-sectional SEM image. FIB was used to obtain a test piece for observation under a TEM so as to include the interface of the plating layer/steel sheet. By observation under a TEM, the internal oxides of ferrite phases falling under the shapes shown in the present application were identified in the range from the steel sheet surface (interface of plating layer/steel sheet) down to a depth of 2 μm toward the steel sheet side and the number density of the same was measured. As the examination position, the position was made 2.0 μm from the steel sheet surface in the depth direction (direction vertical to surface of steel sheet) and was made 1.0 μm of any position of the TEM image in the width direction (direction parallel to surface of steel sheet). The TEM images of the regions of the obtained steel sheet samples were digitalized. The areas of the internal oxides were calculated from the digitalized images and the particle sizes (nm) of the internal oxides were found as diameters of circles having equal areas as those areas, that is, as circle equivalent diameters. Ones having 2 to 100 nm particle sizes in range were deemed "internal oxides". Furthermore, the numbers of internal oxides in the TEM images were counted. The average value of the numbers of the internal oxides in the digitalized images in the 10 locations found in this way was made the number density of fine internal oxides. The number densities ($/\mu m^2$) of the internal oxides of the ferrite phases of the steel sheet samples are shown in Tables 1 and 2.

Further, the internal oxides may also be measured for aspect ratios and short axes. The number densities of internal oxides having predetermined aspect ratios and short axes ($/\mu m^2$) are also shown in Tables 1 and 2.

In addition, the internal oxides are measured for elemental concentrations by EDS (energy dispersed spectroscopy). The number densities of internal oxides having Al concentrations of 20 mass % or more ($/\mu m^2$) are also shown in Tables 1 and 2.

(Evaluation of LME Resistance)

100×100 mm plated steel sheet samples were used for spot welding. Each was cut to sizes of 50 mm×100 mm to prepare two samples. The two Zn-based plated steel sheet samples were spot welded using dome radius type welding electrodes with 8 mm tip diameters. By spot welding by a weld angle of 5°, a pressure of 4.0 kN, a weld time of 0.5 second, and a weld current of 9 kA, a welded member was obtained. The weld part was polished in cross section, then was observed under an optical microscope. The length of the LME fracture occurring at the cross section of the weld part was measured and evaluated in the following way: The results are shown in Tables 1 and 2. The plating types of Tables 1 and 2 were as described in the tables.

Evaluation AAA: no LME fractures
Evaluation AA: LME crack length more than 0 μm to 100 μm
Evaluation A: LME crack length more than 100 μm to 500 μm
Evaluation B: LME crack length more than 500 μm

TABLE 1

| | | Chemical composition (mass %) | | | | | | | | | Thickness of internal oxidation layer at time of hot rolling (μm) | Brush grinding | Heat treatment conditions Humidifying zone (RT: rising temp., ET: equal temp.) |
|---|---|---|---|---|---|---|---|---|---|---|---|---|---|
| No. | Class | Fe | C | Si | Mn | Al | P | S | N | B | Others | | | |
| 1 | Ex. | Bal. | 0.05 | 1.1 | 2.0 | 0.4 | 0.0010 | 0.0001 | 0.0012 | 0.00002 | | 0.5 | Yes | RT + ET |
| 2 | Ex. | Bal. | 0.10 | 2.1 | 2.0 | 0.4 | 0.0054 | 0.0014 | 0.0022 | 0.00002 | | 0 | Yes | RT + ET |
| 3 | Ex. | Bal. | 0.10 | 0.7 | 2.0 | 0.5 | 0.0001 | 0.0010 | 0.0023 | 0.00003 | Hf: 0.001 | 0 | Yes | RT + ET |
| 4 | Ex. | Bal. | 0.10 | 1.5 | 2.2 | 0.5 | 0.0010 | 0.0008 | 0.0020 | 0.00002 | | 0 | Yes | RT + ET |
| 5 | Ex. | Bal. | 0.20 | 0.5 | 2.3 | 0.8 | 0.0030 | 0.0009 | 0.0010 | 0.00001 | Mg: 0.001 | 0.2 | Yes | RT |
| 6 | Ex. | Bal. | 0.20 | 1.0 | 2.0 | 0.8 | 0.0020 | 0.0013 | 0.0004 | 0.00002 | Zr: 0.003 | 0 | Yes | RT + ET |
| 7 | Ex. | Bal. | 0.20 | 1.0 | 2.0 | 0.8 | 0.0012 | 0.0009 | 0.0004 | 0.00002 | | 0 | Yes | RT + ET |
| 8 | Ex. | Bal. | 0.20 | 2.5 | 2.5 | 0.5 | 0.0015 | 0.0002 | 0.0003 | 0.00002 | Cr: 0.01 | 0 | Yes | RT + ET |
| 9 | Ex. | Bal. | 0.20 | 3.0 | 2.3 | 0.5 | 0.0021 | 0.0010 | 0.0002 | 0.00002 | Cu: 0.01 | 0 | Yes | RT |
| 10 | Ex. | Bal. | 0.20 | 1.4 | 2.3 | 0.7 | 0.0060 | 0.0008 | 0.0004 | 0.00001 | Ti: 0.02 | 10 | Yes | RT + ET |
| 11 | Ex. | Bal. | 0.20 | 0.8 | 2.2 | 0.7 | 0.0054 | 0.0024 | 0.0016 | 0.00002 | Ni: 0.3 | 0 | Yes | RT + ET |
| 12 | Ex. | Bal. | 0.25 | 0.8 | 2.2 | 0.7 | 0.0012 | 0.0017 | 0.0011 | 0.00002 | | 0 | Yes | RT + ET |
| 13 | Ex. | Bal. | 0.25 | 1.0 | 2.2 | 1.2 | 0.0053 | 0.0020 | 0.0008 | 0.00000 | Nb: 0.009 | 0 | Yes | RT + ET |
| 14 | Ex. | Bal. | 0.30 | 1.0 | 5.0 | 1.2 | 0.0087 | 0.0020 | 0.0011 | 0.00002 | V: 0.032 | 0 | Yes | RT + ET |
| 15 | Ex. | Bal. | 0.30 | 0.8 | 0.3 | 1.2 | 0.0067 | 0.0021 | 0.0009 | 0.00000 | | 0 | Yes | RT + ET |
| 16 | Ex. | Bal. | 0.35 | 0.6 | 3.0 | 1.0 | 0.0090 | 0.0019 | 0.0007 | 0.00002 | Mo: 0.007 | 0 | Yes | RT + ET |
| 17 | Ex. | Bal. | 0.35 | 1.1 | 2.2 | 0.7 | 0.0075 | 0.0018 | 0.0020 | 0.00001 | REM: 0.002 | 0 | Yes | RT + ET |
| 18 | Ex. | Bal. | 0.40 | 1.0 | 2.2 | 0.7 | 0.0065 | 0.0015 | 0.0010 | 0.00002 | W: 0.002 | 0 | Yes | RT + ET |
| 19 | Ex. | Bal. | 0.40 | 1.1 | 2.2 | 0.7 | 0.0049 | 0.0016 | 0.0006 | 0.00002 | | 0 | Yes | RT + ET |
| 20 | Ex. | Bal. | 0.40 | 1.0 | 2.2 | 0.7 | 0.0073 | 0.0010 | 0.0009 | 0.00002 | Ca: 0.0006 | 0 | Yes | RT + ET |
| 21 | Ex. | Bal. | 0.40 | 1.0 | 2.2 | 0.7 | 0.0066 | 0.0012 | 0.0004 | 0.00001 | | 0 | Yes | RT + ET |
| 37 | Ex. | Bal. | 0.20 | 1.0 | 2.0 | 0.8 | 0.0012 | 0.0009 | 0.0004 | 0.00002 | | 0 | Yes | RT + ET |
| 38 | Ex. | Bal. | 0.20 | 1.0 | 2.0 | 0.8 | 0.0012 | 0.0010 | 0.0004 | 0.00001 | | 0 | Yes | RT + ET |
| 39 | Ex. | Bal. | 0.20 | 1.0 | 1.9 | 1.5 | 0.0010 | 0.0011 | 0.0002 | 0.00002 | | 0 | Yes | RT + ET |

TABLE 1-continued

| No. | | Fe | C | Si | Mn | Al | P | S | N | B | Others | | Brush grinding | Heat treatment conditions Humidifying zone (RT: rising temp., ET: equal temp.) |
|---|---|---|---|---|---|---|---|---|---|---|---|---|---|---|
| 40 | Ex. | Bal. | 0.20 | 1.0 | 2.2 | 0.8 | 0.0012 | 0.0009 | 0.0003 | 0.00001 | | 0 | Yes | RT + ET |
| 51 | Ex. | Bal. | 0.20 | 1.0 | 2.2 | 0.8 | 0.0012 | 0.0009 | 0.0003 | 0.00001 | | 0 | Yes | RT + ET |
| 52 | Ex. | Bal. | 0.20 | 1.0 | 2.2 | 0.8 | 0.0012 | 0.0009 | 0.0003 | 0.00001 | | 0 | Yes | RT + ET |
| 53 | Ex. | Bal. | 0.20 | 1.0 | 2.2 | 0.8 | 0.0012 | 0.0009 | 0.0003 | 0.00001 | | 0 | Yes | RT + ET |

| | Heat treatment conditions | | | | Number density of ferrite phases of circle equivalent diameters of 1 μm or less at surface layer 2 μm (/μm$^2$) | Internal oxides | | | Tensile strength [MPa] | Plating type | LME resistance |
|---|---|---|---|---|---|---|---|---|---|---|---|
| No. | H2 conc. (%) | Dew point (° C.) | Holding temp. (° C.) | Holding time (s) | | Number density of circle equivalent diameters 2 to 100 nm (/μm$^2$) | Number density of aspect ratio 1.5 to 20, short axis 1 to 20 nm (/μm$^2$) | Al conc. 20 mass % or more 53 mass % or less | | | |
| 1 | 10 | 11 | 900 | 5 | 4 | 3 | 0 | No | 780 | a | A |
| 2 | 10 | 11 | 900 | 50 | 5 | 6 | 1 | No | 780 | d | AA |
| 3 | 10 | 11 | 900 | 300 | 2 | 4 | 0 | No | 800 | b | A |
| 4 | 10 | 11 | 830 | 10 | 5 | 6 | 1 | Yes | 810 | b | AA |
| 5 | 10 | 11 | 830 | 0 | 14 | 5 | 0 | No | 920 | c: 0.6% Al | AA |
| 6 | 10 | 11 | 830 | 50 | 7 | 7 | 3 | Yes | 980 | b | AAA |
| 7 | 10 | 20 | 830 | 130 | 8 | 30 | 12 | Yes | 980 | b | AAA |
| 8 | 10 | 20 | 830 | 300 | 5 | 14 | 2 | Yes | 1020 | b | AA |
| 9 | 10 | 11 | 700 | 0 | 4 | 3 | 1 | Yes | 880 | b | AA |
| 10 | 10 | 11 | 700 | 100 | 3 | 8 | 2 | Yes | 870 | c: 0.3% Al | AAA |
| 11 | 10 | 11 | 700 | 300 | 5 | 4 | 3 | Yes | 780 | a | AA |
| 12 | 10 | 11 | 830 | 50 | 4 | 4 | 3 | Yes | 910 | a | AAA |
| 13 | 10 | 11 | 830 | 120 | 10 | 19 | 7 | Yes | 910 | b | AAA |
| 14 | 10 | 11 | 800 | 10 | 30 | 4 | 0 | No | 1470 | d | AA |
| 15 | 10 | 11 | 800 | 100 | 4 | 19 | 5 | Yes | 1300 | a | AAA |
| 16 | 10 | 11 | 800 | 300 | 3 | 10 | 2 | Yes | 1200 | c: 1.5% Al | AAA |
| 17 | 10 | 11 | 830 | 50 | 8 | 11 | 4 | Yes | 1180 | a | AAA |
| 18 | 10 | 11 | 780 | 50 | 7 | 8 | 3 | Yes | 1440 | d | AAA |
| 19 | 10 | 11 | 780 | 100 | 5 | 23 | 8 | Yes | 1450 | a | AAA |
| 20 | 10 | 11 | 780 | 240 | 2 | 8 | 1 | Yes | 1510 | d | AAA |
| 21 | 10 | 11 | 830 | 50 | 6 | 9 | 3 | Yes | 1550 | a | AAA |
| 37 | 8 | 20 | 830 | 130 | 9 | 26 | 8 | Yes | 980 | b | AAA |
| 38 | 14 | 20 | 830 | 130 | 11 | 24 | 10 | Yes | 980 | b | AAA |
| 39 | 16 | 20 | 830 | 130 | 13 | 22 | 9 | Yes | 980 | b | AAA |
| 40 | 20 | 20 | 830 | 130 | 16 | 20 | 11 | Yes | 980 | b | AAA |
| 51 | 10 | 11 | 830 | 130 | 12 | 22 | 10 | Yes | 980 | b | AAA |
| 52 | 10 | 13 | 830 | 130 | 10 | 23 | 11 | Yes | 980 | b | AAA |
| 53 | 10 | 18 | 830 | 130 | 11 | 24 | 10 | Yes | 980 | b | AAA |

TABLE 2

| No. | Class | Chemical composition (mass %) | | | | | | | | | | Thickness of internal oxidation layer at time of hot rolling (μm) | Brush grinding | Heat treatment conditions Humidifying zone (RT: rising temp., ET: equal temp.) |
|---|---|---|---|---|---|---|---|---|---|---|---|---|---|---|
| | | Fe | C | Si | Mn | Al | P | S | N | B | Others | | | |
| 22 | C. ex | Bal. | <u>0.03</u> | 1.5 | 2.0 | 0.7 | 0.0005 | 0.0009 | 0.0012 | 0.00002 | | 0 | Yes | RT + ET |
| 23 | C. ex | Bal. | 0.20 | 1.5 | 2.0 | 0.7 | 0.0011 | 0.0003 | 0.0012 | 0.00002 | | 0 | Yes | RT + ET |
| 24 | C. ex | Bal. | 0.20 | 1.5 | 2.0 | 0.7 | 0.0010 | 0.0012 | 0.0010 | 0.00002 | | 0 | Yes | RT + ET |
| 25 | C. ex | Bal. | 0.20 | 1.5 | 2.0 | 0.7 | 0.0050 | 0.0020 | 0.0018 | 0.00002 | | 0 | Yes | RT + ET |

TABLE 2-continued

| No. | | | | | | | | | | | | |
|---|---|---|---|---|---|---|---|---|---|---|---|---|
| 26 | C. ex | Bal. | 0.20 | 1.5 | 2.0 | 0.7 | 0.0046 | 0.0029 | 0.0018 | 0.00001 | 0 | Yes | RT + ET |
| 27 | C. ex | Bal. | 0.20 | 1.8 | 2.0 | 0.7 | 0.0029 | 0.0031 | 0.0020 | 0.00000 | 0 | No | RT |
| 28 | C. ex | Bal. | 0.20 | 1.5 | 2.0 | 0.7 | 0.0026 | 0.0055 | 0.0024 | 0.00001 | 0 | Yes | RT + ET |
| 29 | C. ex | Bal. | 0.20 | 4.4 | 2.0 | 1.1 | 0.0011 | 0.0025 | 0.0020 | 0.00002 | 0 | Yes | RT + ET |
| 30 | C. ex | Bal. | 0.20 | 0 | 2.0 | 1.2 | 0.0064 | 0.0044 | 0.0022 | 0.00001 | 0 | Yes | RT + ET |
| 31 | C. ex | Bal. | 0.20 | 1.7 | 6.2 | 1.2 | 0.0024 | 0.0025 | 0.0032 | 0.00002 | 0 | Yes | RT + ET |
| 32 | C. ex. | Bal. | 0.20 | 1.5 | 0 | 0.8 | 0.0014 | 0.0038 | 0.0020 | 0.00002 | 0 | Yes | RT + ET |
| 33 | C. ex. | Bal. | 0.20 | 1.7 | 2.0 | 1.9 | 0.0088 | 0.0041 | 0.0044 | 0.00003 | 0 | Yes | RT + ET |
| 34 | C. ex | Bal. | 0.20 | 1.8 | 2.0 | 0.3 | 0.0065 | 0.0035 | 0.0044 | 0.00000 | 0 | Yes | RT + ET |
| 35 | C. ex. | Bal. | 0.20 | 1.7 | 2.0 | 0.8 | 0.0067 | 0.0030 | 0.0050 | 0.00002 | 0 | No | RT + ET |
| 36 | C. ex | Bal. | 0.20 | 1.7 | 2.0 | 0.8 | 0.0067 | 0.0030 | 0.0050 | 0.00002 | 0 | Yes | RT + ET |
| 41 | C. ex | Bal. | 0.20 | 1.7 | 2.0 | 0.8 | 0.0067 | 0.0030 | 0.0050 | 0.00002 | 0.7 | Yes | RT + ET |
| 42 | C. ex | Bal. | 0.20 | 1.5 | 2.0 | 0.7 | 0.0022 | 0.0055 | 0.0020 | 0.00001 | 0 | Yes | RT + ET |
| 43 | C. ex | Bal. | 0.20 | 1.5 | 2.0 | 0.7 | 0.0011 | 0.0003 | 0.0012 | 0.00002 | 0 | Yes | RT + ET |
| 44 | C. ex | Bal. | 0.20 | 1.5 | 2.0 | 0.7 | 0.0011 | 0.0003 | 0.0012 | 0.00002 | 0 | Yes | RT + ET |
| 45 | C. ex. | Bal. | 0.20 | 1.7 | 2.0 | 0.8 | 0.0067 | 0.0030 | 0.0050 | 0.00002 | 0 | Yes | RT + ET |
| 46 | C. ex | Bal. | 0.20 | 1.7 | 2.0 | 0.8 | 0.0067 | 0.0030 | 0.0050 | 0.00002 | 0 | Yes | RT + ET |
| 47 | C. ex | Bal. | 0.20 | 1.7 | 2.0 | 0.8 | 0.0067 | 0.0030 | 0.0050 | 0.00002 | 0 | Yes | ET |

| | Heat treatment conditions | | | | Number density of ferrite phases of circle equivalent diameters of 1 μm or less at surface layer 2 μm (/μm$^2$) | Internal oxides | | | | | |
|---|---|---|---|---|---|---|---|---|---|---|---|
| No. | H2 conc. (%) | Dew point (° C.) | Holding temp. (° C.) | Holding time (s) | | Number density of circle equivalent diameters 2 to 100 nm (/μm$^2$) | Number density of aspect ratio 1.5 to 20, short axis 1 to 20 nm (/μm$^2$) | Al conc. 20 mass % or more 53 mass % or less | Tensile strength [MPa] | Plating type | LME resistance |
| 22 | 10 | 11 | 750 | 50 | 3 | 2 | 0 | No | 400 | a | B |
| 23 | 20 | 0 | 750 | 50 | 0 | 0 | 0 | No | 830 | a | B |
| 24 | 10 | 40 | 750 | 50 | | | Plating not possible | | | | |
| 25 | 10 | 11 | 950 | 50 | 0 | 0 | 0 | No | 790 | a | B |
| 26 | 10 | 11 | 650 | 50 | 0 | 0 | 0 | No | 580 | a | B |
| 27 | 10 | 11 | 750 | 0 | 0 | 2 | 0 | No | 840 | a | B |
| 28 | 10 | 11 | 880 | 350 | 0 | 0 | 0 | No | 820 | a | B |
| 29 | 10 | 20 | 750 | 50 | | | Plating not possible | | | | |
| 30 | 10 | 11 | 750 | 50 | 0 | 2 | 0 | No | 880 | a | B |
| 31 | 10 | 11 | 750 | 50 | | | Plating not possible | | | | |
| 32 | 10 | 11 | 750 | 50 | 0 | 1 | 0 | No | 1180 | a | B |
| 33 | 10 | 11 | 750 | 50 | | | Plating not possible | | | | |
| 34 | 10 | 11 | 750 | 50 | 4 | 1 | 0 | No | 820 | a | B |
| 35 | 10 | 11 | 750 | 50 | 1 | 2 | 0 | No | 830 | a | B |
| 36 | 4 | 20 | 750 | 50 | | | Plating not possible | | | | |
| 41 | 10 | 11 | 750 | 50 | 0 | 0 | 0 | No | 830 | a | B |
| 42 | 10 | 11 | 880 | 310 | 1 | 2 | 0 | Nc | 820 | a | B |
| 43 | 20 | 10 | 800 | 50 | 2 | 2 | 0 | No | 830 | a | B |
| 44 | 20 | 22 | 750 | 50 | | | Plating not possible | | | | |
| 45 | 7 | 11 | 750 | 50 | 2 | 1 | 0 | No | 830 | a | B |
| 46 | 22 | 11 | 750 | 50 | 1 | 0 | 0 | No | 830 | a | B |
| 47 | 10 | 11 | 800 | 50 | 2 | 0 | 0 | No | 830 | a | B |

In each of Sample Nos. 1 to 21, 37 to 40, and 51 to 53 of Table 1, the chemical composition of the steel sheet and the number densities of the fine ferrite phases and their internal oxides fell in the ranges of the present invention, so high strength and LME resistance were possessed. Sample Nos. 22 to 36 and 41 to 47 of Table 2 are comparative examples outside the ranges of the present invention. In Sample No. 22, the amount of C was insufficient, so sufficient strength could not be obtained. In Sample No. 23, the dew point at the time of annealing was low, an internal oxidation layer was not sufficiently formed, further fine ferrite phases were not sufficiently formed, and high LME resistance could not be obtained. In Sample No. 24, the dew point at the time of annealing was high, an external oxidation layer was formed on the surface of the steel sheet, and a plating layer could not be obtained. In Sample No. 25, the holding temperature at the time of annealing was high, the internal oxides coarsened, the desired internal oxides were not obtained, further, the ferrite phases also grew, the desired fine ferrite phases were not obtained, and high LME resistance could not be obtained. In Sample No. 26, the holding temperature at the time of annealing was low, internal oxides were not sufficiently formed, and, further, the pinning effect of the ferrite phase grain boundaries by the internal oxides was insufficient, the ferrite phases coarsened, and high LME resistance could not be obtained. In Sample No. 27, brush grinding was not performed before annealing, so internal oxides were not sufficiently obtained, and, further fine ferrite phases were not formed and high LME resistance could not be obtained. In Sample No. 28, the holding time at the time of annealing was long, the internal oxides coarsened, and a sufficiently large amount of internal oxides was not formed. Further, the pinning effect of the ferrite phase grain boundaries by the internal oxides was insufficient, so the desired ferrite phases were not formed. For this reason, high LME resistance could not be obtained. In each of Sample Nos. 29 and 31, the amount of Si and amount of Mn were excessive, an external oxidation layer was formed on the surface of the steel sheet, and a plating layer could not be obtained. In each of Sample Nos. 30 and 32, the amount of Si and amount of Mn were insufficient, fine ferrite phases were not sufficiently formed, and high LME resistance could not be obtained. In Sample No. 33, the amount of Al was excessive, an external oxidation layer was formed on the surface of the steel sheet, and a plating layer could not be obtained. In Sample No. 34, the amount of Al was insufficient, internal oxides were not sufficiently formed, and high LME resistance could not be obtained. In Sample No. 35, brush grinding was not performed before annealing, so internal oxides were not sufficiently obtained and, further, fine ferrite phases were not formed and high LME resistance could not be obtained. In Sample No. 36, as the humidifying atmosphere at the time of annealing, dew point 20° C. 4 vol % $H_2$ was used. An external oxidation layer was formed on the surface of the steel sheet, so a plating layer could not be obtained. In Sample No. 41, the cold rolled steel sheet was not pickled, an internal oxidation layer formed by rolling was left, and then brush grinding and heat treatment were performed under the conditions described in Table 1. The depth of the internal oxidation layer of the cold rolled steel sheet was 0.7 µm, so fine ferrite phases and their internal oxides were not sufficiently formed, and high LME resistance could not be obtained. In No. 42, the holding time at the time of annealing was long, the internal oxides coarsened, and a sufficiently large amount of internal oxides was not formed. Further, the pinning effect of the ferrite phase grain boundaries by the internal oxides was insufficient, so the desired ferrite phases were not formed. For this reason, high LME resistance could not be obtained. In Sample No. 43, the dew point at the time of annealing was low (in other words, was not more than 10° C.), the internal oxidation layer was not sufficiently formed, and a high LME resistance could not be obtained. In No. 44, the dew point at the time of annealing was high, an external oxidation layer was formed on the surface of the steel sheet, and plating layer could not be obtained. In Sample No. 45, as the humidifying atmosphere at the time of annealing, dew point 11° C. 7 vol % $H_2$ was used, an external oxidation layer was formed, an internal oxidation layer was not sufficiently formed, and the LME resistance was insufficient. In Sample No. 46, as the humidifying atmosphere at the time of annealing, dew point 11° C. 22 vol % $H_2$ was used and an internal oxidation layer was not sufficiently formed, the pinning effect of the ferrite phase grain boundaries by the internal oxides was insufficient, the ferrite phases coarsened, and the LME resistance was insufficient. In Sample No. 47, humidification at the time of temperature elevation was not performed. Humidification was performed only at the time of equal temperature. Therefore, a sufficiently large amount of internal oxides was not formed. For this reason, high LME resistance could not be obtained.

In the invention examples, fine ferrite phases and their internal oxides were confirmed near the steel sheet surface. Therefore, high LME resistance was obtained. On the other hand, in the comparative examples, fine ferrite phases and their internal oxides were not suitably formed near the steel sheet surface. Therefore, it was confirmed that either the LME resistance was inferior or a plating layer was not formed or both.

INDUSTRIAL APPLICABILITY

According to the present invention, it becomes possible to provide high strength plated steel sheet having a high LME resistance. The plated steel sheet can be suitably used for automobiles, household electrical appliances, building materials, and other applications, in particular for automobiles. High collision safety and longer life as steel sheet for automobile use and plated steel sheet for automobile use can be expected. Therefore, the present invention can be said to be an invention with an extremely high industrial value.

The invention claimed is:

1. A plated steel sheet comprising a steel sheet and a plating layer containing Zn on the steel sheet,
wherein
the steel sheet has a tensile strength of 780 MPa or more,
the steel sheet has a chemical composition containing, by mass %,
C: 0.05 to 0.40%,
Si: 0.2 to 3.0%,
Mn: 0.1 to 5.0%,
sol. Al: 0.4 to 1.50%,
P: 0.0300% or less,
S: 0.0300% or less,
N: 0.0100% or less,
B: 0 to 0.010%,
Ti: 0 to 0.150%,
Nb: 0 to 0.150%,
V: 0 to 0.150%,
Cr: 0 to 2.00%,
Ni: 0 to 2.00%,
Cu: 0 to 2.00%,
Mo: 0 to 1.00%,
W: 0 to 1.00%,
Ca: 0 to 0.100%,
Mg: 0 to 0.100%,
Zr: 0 to 0.100%,
Hf: 0 to 0.100%, and
REM: 0 to 0.100% and having a balance of Fe and impurities, and,
in any vertical cross section of the steel sheet, ferrite phases with a circle equivalent diameter of 1 µm or less are contained in a region from a surface layer down to a depth of 2 µm in a number density of 2 to 30/µm$^2$ and the ferrite phases include internal oxides with a circle equivalent diameter of 2 to 100 nm in a number density of 3/µm$^2$ or more.

2. The plated steel sheet according to claim 1, wherein the internal oxides are shaped with an aspect ratio of 1.5 to 20, have short axes of 1 to 20 nm, and are present in a number density of 3 to 30/μm².

3. The plated steel sheet according to claim 1, wherein the internal oxides comprise one or more of Al and O; Al, Si, and O; Al, Mn, and O; and Al, Si, Mn, and O and the content of Al in the internal oxides is 20 to 53 mass %.

4. The plated steel sheet according to claim 1, wherein the plating layer has a chemical composition containing, by mass %, Al: 0.3 to 1.5% and having a balance of Zn and impurities.

5. The plated steel sheet according to claim 1, wherein the plating layer has a chemical composition containing, by mass %, less than Al: 0 to less than 0.1% and having a balance of Zn and impurities.

6. The plated steel sheet according to claim 2, wherein the internal oxides comprise one or more of Al and O; Al, Si, and O; Al, Mn, and O; and Al, Si, Mn, and O and the content of Al in the internal oxides is 20 to 53 mass %.

7. The plated steel sheet according to claim 2, wherein the plating layer has a chemical composition containing, by mass %, Al: 0.3 to 1.5% and having a balance of Zn and impurities.

8. The plated steel sheet according to claim 3, wherein the plating layer has a chemical composition containing, by mass %, Al: 0.3 to 1.5% and having a balance of Zn and impurities.

9. The plated steel sheet according to claim 6, wherein the plating layer has a chemical composition containing, by mass %, Al: 0.3 to 1.5% and having a balance of Zn and impurities.

10. The plated steel sheet according to claim 2, wherein the plating layer has a chemical composition containing, by mass %, Al: 0 to less than 0.1% and having a balance of Zn and impurities.

11. The plated steel sheet according to claim 3, wherein the plating layer has a chemical composition containing, by mass %, Al: 0 to less than 0.1% and having a balance of Zn and impurities.

12. The plated steel sheet according to claim 6, wherein the plating layer has a chemical composition containing, by mass %, Al: 0 to less than 0.1% and having a balance of Zn and impurities.

* * * * *